(12) United States Patent
Yakita

(10) Patent No.: US 9,104,017 B2
(45) Date of Patent: Aug. 11, 2015

(54) ZOOM LENS AND IMAGE PICKUP APPARATUS INCLUDING THE SAME

(71) Applicant: CANON KABUSHIKI KAISHA, Tokyo (JP)

(72) Inventor: Shinichiro Yakita, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/259,217

(22) Filed: Apr. 23, 2014

(65) Prior Publication Data

US 2014/0320977 A1    Oct. 30, 2014

(30) Foreign Application Priority Data

Apr. 30, 2013  (JP) ................................. 2013-095318

(51) Int. Cl.
   *G02B 15/177*    (2006.01)
(52) U.S. Cl.
   CPC .................................... *G02B 15/177* (2013.01)
(58) Field of Classification Search
   CPC ........... G02B 15/177; G02B 9/34; G02B 9/36
   See application file for complete search history.

(56) References Cited

U.S. PATENT DOCUMENTS

2004/0070844 A1* 4/2004 Sato .............................. 359/687

FOREIGN PATENT DOCUMENTS

| JP | H06-242378 A | 9/1994 |
|---|---|---|
| JP | H09-15501 A | 1/1997 |
| JP | H10-31157 A | 2/1998 |
| JP | 2000-321496 A | 11/2000 |
| JP | 2001-21804 A | 1/2001 |
| JP | 2001-116993 A | 4/2001 |
| JP | 2005-249974 A | 9/2005 |
| JP | 2009-42346 A | 2/2009 |
| JP | 2012-113139 A | 6/2012 |

* cited by examiner

*Primary Examiner* — Joseph P Martinez

(74) *Attorney, Agent, or Firm* — Carter, DeLuca, Farrell & Schmidt, LLP

(57) ABSTRACT

A zoom lens includes in order from an object side: a positive first lens unit; a negative second lens unit which moves during zooming; a third lens unit; a stop; and a positive fourth lens unit. The first lens unit includes, in order from the object side, a negative first lens subunit which does not move, a positive second lens subunit which moves during focusing, and a positive third lens subunit which does not move. The first lens subunit is composed of one or more negative lenses, and the second lens subunit includes a positive lens and a negative lens. An average value of Abbe constants of the first lens subunit, an average value of Abbe constants of the positive lenses of the second lens subunit, and an average value of Abbe constants of the negative lenses of the second lens subunit are appropriately set.

6 Claims, 9 Drawing Sheets

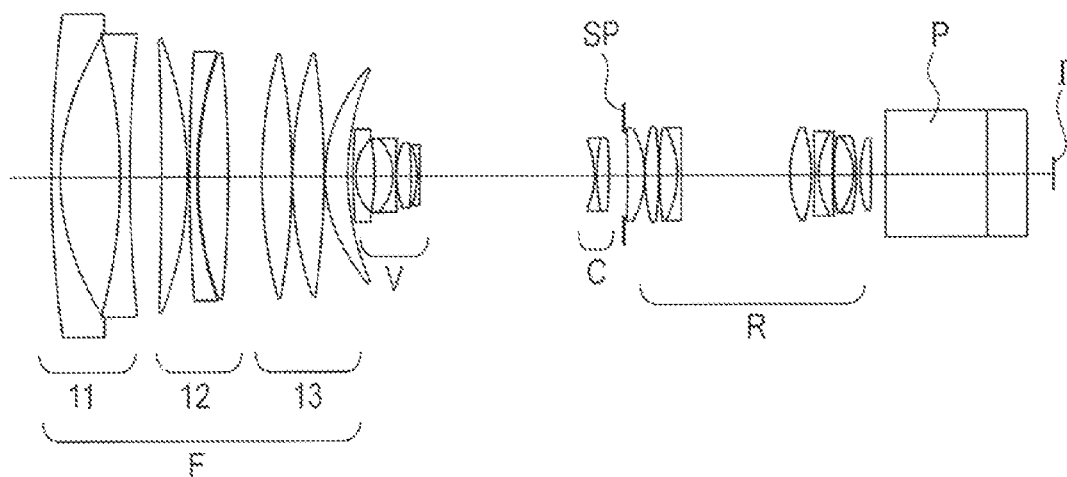
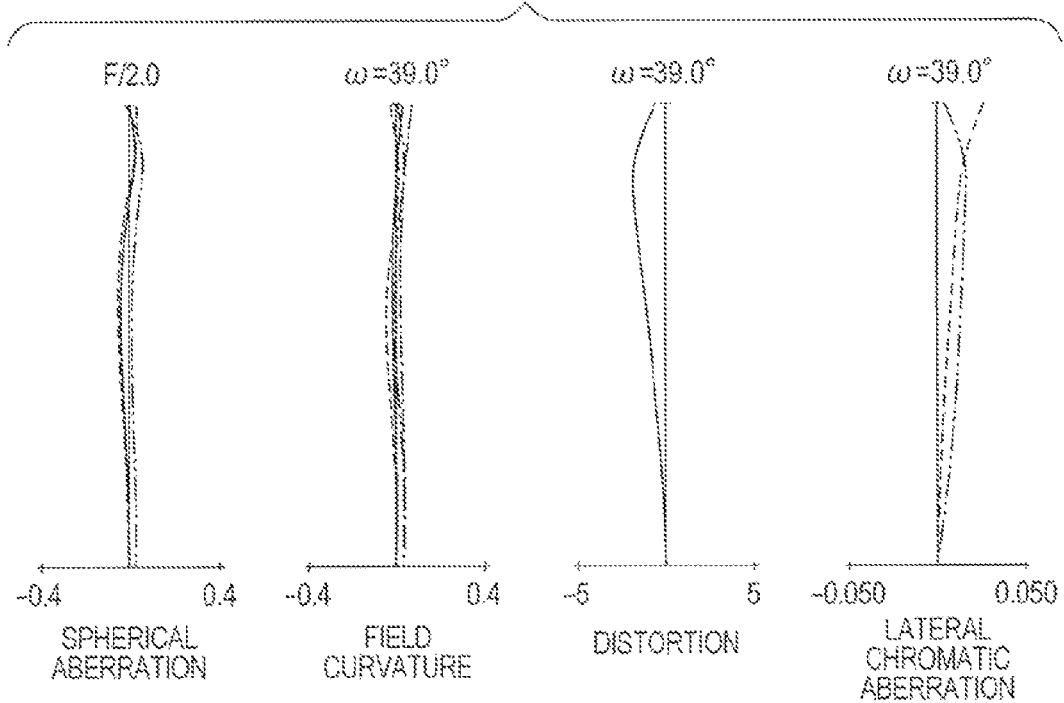

ZOOM LENS AND IMAGE PICKUP APPARATUS INCLUDING THE SAME

BACKGROUND OF THE INVENTION

1. Field of the Invention

The present invention relates to a zoom lens which is suitable for use in a broadcasting television camera, a video camera, a digital still camera, and a silver-halide film camera, and also to an image pickup apparatus including the zoom lens.

2. Description of the Related Art

Hitherto, for an image pickup apparatus such as a television camera, a silver-halide film camera, a digital camera, and a video camera, there is proposed a zoom lens including, in order from an object side to an image side, a positive first lens unit having a focus unit, a negative second lens unit for zooming, a positive or negative third lens unit for correcting image plane variation due to the zooming, and a positive fourth lens unit for image formation.

In particular, there is proposed a zoom lens in which the first lens unit includes, in order from the object side to the image side, a fixed negative first lens subunit, a positive second lens subunit for focusing, and a fixed positive third lens subunit, which is advantageous for suppressing a variation of performance depending on an object distance, suppressing a variation of an angle of field due to focusing, and achieving a wider angle of field.

Japanese Patent Application Laid-Open No. H09-15501 discloses an embodiment having an angle of field of 78° or smaller at a wide angle end. The first lens subunit includes at least one positive lens, and the second lens subunit includes at least one positive lens and a cemented lens, so as to achieve good optical performance over the entire zoom range and the entire object distance range.

Japanese Patent Application Laid-Open No. 2009-42346 discloses an embodiment having an angle of field of 99° or smaller at the wide angle end. An aspherical lens is appropriately disposed in the second lens subunit, so as to obtain high optical performance over the entire object distance range.

Japanese Patent Application Laid-Open No. 2000-321496 discloses an embodiment having an angle of field of 78° or smaller at the wide angle end. Aspherical lenses are disposed in the first lens subunit and in the third lens subunit, so as to achieve high optical performance over the entire zoom range.

Japanese Patent Application Laid-Open No. 2001-21804 discloses an embodiment having an angle of field of 78° or smaller at the wide angle end. Aspherical lenses are disposed in the second lens subunit and in the third lens subunit, and refractive powers of the first lens subunit to the third lens subunit are appropriately set, so as to achieve high optical performance over the entire focus range.

Japanese Patent Application Laid-Open No. 2001-116993 discloses an embodiment having an angle of field of 74° or smaller at the wide angle end. Lateral magnifications and focal lengths of individual lens units are appropriately set, so as to achieve a reduction of a variation of an angle of field due to focusing.

Japanese Patent Application Laid-Open No. 2012-113139 discloses an embodiment having an angle of field of 75° or smaller at the wide angle end. Refractive powers and glass types of the first lens unit and the second lens unit are appropriately set, so as to achieve a wide angle of field, a high zoom ratio, and high optical performance over the entire zoom range.

Japanese Patent Application Laid-Open No. 2005-249974 discloses an embodiment having an angle of field of 81° or smaller at the wide angle end. Lens configurations of the first lens subunit, the second lens subunit, and the third lens subunit are appropriately set, so as to achieve reductions in size and weight of the first lens unit while maintaining high optical performance.

Japanese Patent Application Laid-Open No. H10-31157 discloses an embodiment having an angle of field of 75° or smaller at the wide angle end. The second lens unit is divided into a second lens unit A and a second lens unit B, and an interval between the lens units is changed in zooming, so as to achieve reductions in size and weight of the entire lens system while maintaining a variation of performance to be small over the entire zoom range and the entire focus range.

Japanese Patent Application Laid-Open No. H06-242378 discloses an embodiment having an angle of field of 64° or smaller at the wide angle end. Focal lengths and glass types of the first lens subunit and the second lens subunit are appropriately set, so as to achieve a lens unit having a high zoom ratio, a wide angle of field, and a short distance at close range.

In Japanese Patent Application Laid-Open No. H09-15501 and Numerical Embodiments 1 and 2 of Japanese Patent Application Laid-Open No. H06-242378, in order to maintain high optical performance over the entire zoom range and the entire focus range even when a wider angle of field and a higher zoom ratio are achieved, the first lens subunit includes at least three lenses in total including one positive lens and two negative lenses.

In addition, in Numerical Embodiment 3 of Japanese Patent Application Laid-Open No. H06-242378, the first lens subunit includes two negative lenses, and the second lens subunit includes one positive lens and one cemented lens. The first lens subunit has a relatively simple structure, but it is difficult to suppress a variation of axial chromatic aberration over the entire focus range.

SUMMARY OF THE INVENTION

Therefore, the present invention provides a small size and light weight zoom lens, which is optimal for a high magnification zoom lens for broadcasting in particular, and has a simple structure of a first lens unit and good optical performance with suppressed variation over the entire focus range from an object at infinity to a short distance object, and to provide an image pickup apparatus including the zoom lens.

According to one embodiment of the present invention, there are provided a zoom lens and an image pickup apparatus including the zoom lens, including, in order from an object side to an image side: a first lens unit having a positive refractive power; a second lens unit having a negative refractive power which moves during zooming; a third lens unit; a stop; and a fourth lens unit having a positive refractive power. The first lens unit includes, in order from the object side to the image side, a first lens subunit having a negative refractive power which does not move, a second lens subunit having a positive refractive power which moves during focusing, and a third lens subunit having a positive refractive power which does not move. The first lens subunit is composed of one or more negative lenses, and the second lens subunit includes at least one positive lens and at least one negative lens. The following expression is satisfied:

$$9\times10^6 < v11a^3 \times (v12ap - v12an) < 45\times10^6,$$

where v11a represents an average value of Abbe constants of the first lens subunit, v12ap represents an average value of Abbe constants of the at least one positive lens of the second lens subunit, v12an represents an average value of Abbe constants of the at least one negative lens of the second lens subunit, and Abbe constant ν is defined as, $$\nu=(Nd-1)/(NF-NC)$$

where NF represents a refractive index for F-line, Nd represents a refractive index for d-line, and NC represents a refractive index for C-line.

It is preferred that in the zoom lens and the image pickup apparatus including the zoom lens according to one embodiment of the present invention, the following expressions be satisfied:

$$1.8<|\phi11/\phi12|<7.0, \text{ and}$$

$$0.5<|\phi11/\phi1|<1.0,$$

where $\phi11$ represents a refractive power of the first lens subunit, $\phi12$ represents a refractive power of the second lens subunit, and $\phi1$ represents a refractive power of the first lens unit.

It is preferred that in the zoom lens and the image pickup apparatus including the zoom lens according to one embodiment of the present invention, the following expression be satisfied:

$$0.020<\theta11a\times(\theta12an-\theta12ap)<0.046,$$

where θ11a represents an average value of partial dispersion ratios of the first lens subunit, θ12ap represents an average value of partial dispersion ratios of the at least one positive lens of the second lens subunit, and θ12an represents an average value of partial dispersion ratios of the at least one negative lens of the second lens subunit. Note that, a partial dispersion ratio θ=(Ng−NF)/(NF−NC) holds, where NF represents a refractive index for F-line, Ng represents a refractive index for g-line, and NC represents a refractive index for C-line.

It is more preferred that in the zoom lens and the image pickup apparatus including the zoom lens according to one embodiment of the present invention, the following expressions be satisfied:

$$0.5<\nu11a/(\nu13ap-\nu13an)<4.0, \text{ and}$$

$$0.6<\phi13/\phi1<1.5,$$

where $\phi13$ represents a refractive power of the third lens subunit, and ν13a represents an average value of Abbe constants of the third lens subunit.

In addition, it is preferred that the following expression be satisfied:

$$0.15<|\phi1/\phi2|<0.30,$$

where $\phi2$ represents a refractive power of the second lens unit.

Further features of the present invention will become apparent from the following description of exemplary embodiments with reference to the attached drawings.

According to one embodiment of the present invention, it is possible to provide the small size and light weight zoom lens having a simple structure of the first lens unit and good optical performance with suppressed variation over the entire focus range from an object at infinity to a short distance object.

BRIEF DESCRIPTION OF THE DRAWINGS

FIG. 1 is a cross-sectional view at a wide angle end and in focus at infinity according to Numerical Embodiment 1.

FIG. 2 is an aberration diagram at the wide angle end and in focus at 2.5 m according to Numerical Embodiment 1.

DESCRIPTION OF THE EMBODIMENTS

Figure 3:
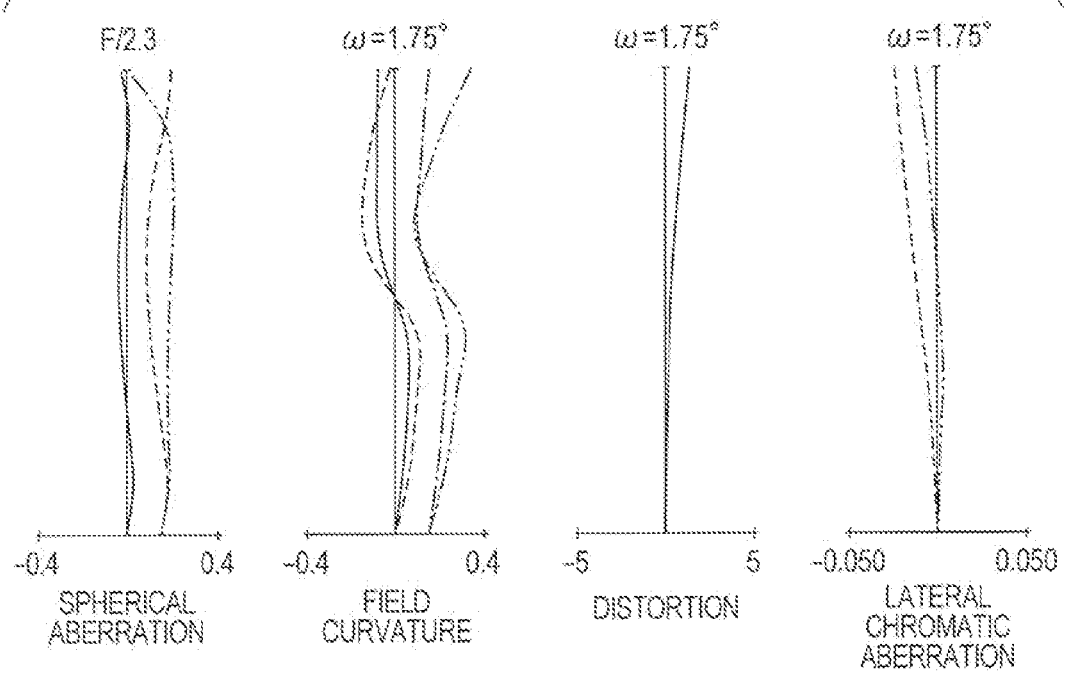
FIG. 3 is an aberration diagram at a telephoto end and in focus at 3.5 m according to Numerical Embodiment 1.

A zoom lens according to the present invention is described in detail referring to the attached drawings.

The zoom lens according to the present invention includes, in order from an object side to an image side, a first lens unit having a positive refractive power, a second lens unit having a negative refractive power which moves during zooming, a third lens unit which moves in an optical axis direction for correcting an image plane position, a stop, and a fourth lens unit having a positive refractive power for image formation. The first lens unit includes a first lens subunit having a negative refractive power which does not move, a second lens subunit having a positive refractive power which moves during focus adjustment, and a third lens subunit having a positive refractive power which does not move. The first lens subunit includes only a lens having a negative refractive power, and the second lens subunit includes at least one positive lens and at least one negative lens.

The zoom lens of the present invention satisfies the following conditional expressions:

$$9\times10^6<\nu11a^3\times(\nu12ap-\nu12an)<45\times10^6 \quad (1),$$

$$1.8<|\phi11/\phi12|<7.0 \quad (2), \text{ and}$$

$$0.5<|\phi11/\phi1|<1.0 \quad (3),$$

where $\phi11$ represents a refractive power of the first lens subunit, $\phi12$ represents a refractive power of the second lens subunit, $\phi1$ represents a refractive power of the first lens unit, ν11a represents an average value of Abbe constants of the first lens subunit, ν12ap represents an average value of Abbe constants of lenses having positive refractive powers of the second lens subunit, and ν12an represents an average value of Abbe constants of lenses having negative refractive powers of the second lens subunit.

It is preferred that, the zoom lens satisfy the following conditional expression:

$$0.020 < \theta 11ax(\theta 12an - \theta 12ap) < 0.046 \quad (4),$$

where θ11a represents an average value of partial dispersion ratios of materials of lenses included in the first lens subunit, θ12ap represents an average value of partial dispersion ratios of materials of lenses having positive refractive powers included in the second lens subunit, and θ12an represents an average value of partial dispersion ratios of materials of lenses having negative refractive powers included in the second lens subunit. Here, a partial dispersion ratio θ=(Ng−NF)/(NF−NC) holds, where Ng represents a refractive index at g-line, NF represents a refractive index at F-line and NC represents a refractive power at C-line.

It is more preferred that, the zoom lens satisfy the following conditional expressions:

$$0.5 < v11a/(v13ap - v13an) < 4.0 \quad (5), \text{ and}$$

$$0.6 < \phi 13/\phi 1 < 1.5 \quad (6),$$

where φ13 represents a refractive power of the third lens subunit, and v13a represents an average value of Abbe constants of materials of lenses included in the third lens subunit.

In addition, the zoom lens satisfies the following conditional expression:

$$0.15 < |\phi 1/\phi 2| < 0.30 \quad (7),$$

where φ2 represents a refractive power of the second lens unit.

The conditional expressions (1) to (7) define conditions of the zoom lens configuration, dispersion characteristics of lens materials, and refractive powers thereof, so as to define conditions to achieve reductions in size and weight of the zoom lens, secondary spectrum correction of axial chromatic aberration at a telephoto end, and good optical performance with suppressed variation of performance over the entire focus range from an object at infinity to a short distance object.

Figure 16:
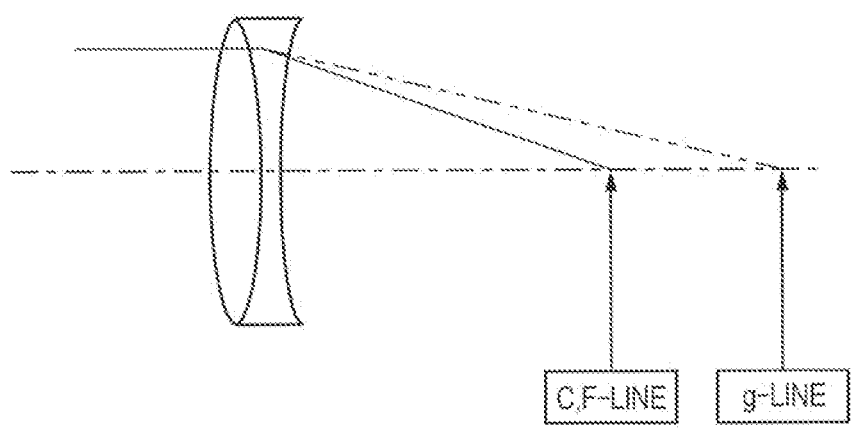
FIG. 16 is a schematic diagram illustrating dichroic achromatism and remaining secondary spectrum of a positive lens unit.
Figure 17:
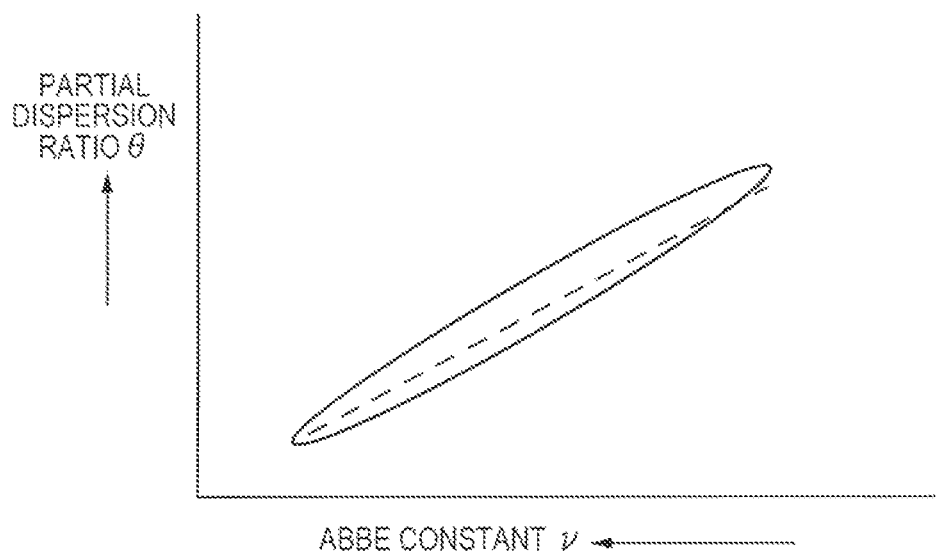
FIG. 17 is a schematic diagram of distribution of an Abbe constant ν and a partial dispersion ratio θ of optical materials.

An outline of secondary spectrum of axial chromatic aberration at the telephoto end is described with reference to FIGS. 16 and 17. FIG. 16 illustrates a schematic diagram concerning dichroic achromatism and remaining secondary spectrum of a positive lens unit. FIG. 17 shows a schematic diagram of distribution of Abbe constants v and partial dispersion ratios θ of existing optical materials. Here, when a refractive index for g-line is represented by Ng, a refractive index for F-line is represented by NF, a refractive index for d-line is represented by Nd, and a refractive index for C-line is represented by NC, the Abbe constant v and the partial dispersion ratio θ satisfy the following expressions (8) and (9), respectively.

$$v = (Nd-1)/(NF-NC) \quad (8)$$

$$\theta = (Ng-NF)/(NF-NC) \quad (9)$$

As shown in FIG. 17, the existing optical material is distributed in a region having a narrow partial dispersion ratio θ with respect to the Abbe constant v, and there is a tendency that the partial dispersion ratio θ increases as the Abbe constant v decreases.

A correction condition of chromatic aberration of a thin lens system which has a predetermined refractive power φ and includes two lenses 1 and 2 having refractive powers φ1 and φ2 and Abbe constants v1 and v2, respectively, is expressed by the following expression.

$$\phi 1/v1 + \phi 2/v2 = 0 \quad (10)$$

Here, φ is expressed as follows.

$$\phi = \phi 1 + \phi 2 \quad (11)$$

When the expression (10) is satisfied, an image position is identical between the C-line and the F-line.

In this case, the refractive powers φ1 and φ2 are expressed by the following expressions.

$$\phi 1 = \phi \times v1/(v1-v2) \quad (12)$$

$$\phi 2 = -\phi \times v2/(v1-v2) \quad (13)$$

In FIG. 16, as to the achromatism for the positive lens unit, a material having a large Abbe constant v1 is used for the positive lens 1, and a material having a small Abbe constant v2 is used for the negative lens 2. Therefore, the positive lens 1 has a small partial dispersion ratio θ1, and the negative lens 2 has a large partial dispersion ratio θ2 as shown in FIG. 17. Thus, when the chromatic aberration is corrected at the F-line and the C-line, the image point at the g-line is shifted to the image side. This deviation amount defined as a secondary spectrum amount Δ is expressed by the following expression.

$$\Delta = -(1/\phi) \times (\theta 1 - \theta 2)/(v1-v2) \quad (14)$$

The secondary spectrum amount Δ of the entire lens system is expressed by the following expression:

$$\Delta = \Delta 11 \times \beta 12^2 \times \beta 13^2 \times \beta Z + \Delta 12 \times (1-\beta 12) \times \beta 13^2 \cdot \beta Z^2 + \Delta 13 \times (1-\beta 13) \times \beta Z^2 + \Delta Z \times (1-\beta Z) \quad (15)$$

where Δ11, Δ12, Δ13, and ΔZ represent the secondary spectrum amounts of the first lens subunit, the second lens subunit, the third lens subunit, and the lens unit after the zooming system, respectively, and β12, β13, and βZ represent imaging magnification of the second lens subunit, the third lens subunit, and the lens unit after the zooming system, respectively.

The secondary spectrum amount Δ becomes significant in the first lens subunit to the third lens subunit in which an axial marginal light beam passes through at a high position on the telephoto side. Therefore, the secondary spectrum amount Δ of the axial chromatic aberration may be reduced on the telephoto side by suppressing the sum of the secondary spectrum amounts Δ11, Δ12, and Δ13 of the axial chromatic aberration generated in the first lens subunit to the third lens subunit.

Next, a variation of performance over the entire focus range from an object at infinity to a short distance object is described. Here, Δinf represents a secondary spectrum amount at an object at infinity, Δ mod represents a secondary spectrum amount of a short distance object that is photographable. In addition, Δ11inf and Δ12inf represent secondary spectrum amounts of the first lens subunit and the second lens subunit at an object at infinity, and Δ11 mod and Δ12 mod represent secondary spectrum amounts of the first lens subunit and the second lens subunit at a short distance object. In addition, β12inf represents an imaging magnification of the second lens subunit at an object at infinity, and β12 mod represents an imaging magnification of the second lens subunit at a shortest distance object. Because the second lens subunit is a focus lens unit, a position on the optical axis of an object point of the third lens subunit does not change regardless of the object distance. Therefore, Δ13, ΔZ, β13, and βZ do not change depending on the object distance. In this case, a variation amount Δobj of the secondary spectrum of axial chromatic aberration of a short distance object with respect to an object at infinity is expressed by the following expression derived from the expression (13).

$$\Delta obj = \Delta \text{ mod} - \Delta \text{inf} = \{(\Delta 11 \text{ mod} \times \beta 12 \text{ mod}^2 - \Delta 11 \text{inf} \times \beta 12 \text{inf}^2) - (\Delta 12 \text{ mod} \times \beta 12 \text{ mod} - \Delta 12 \text{inf} \times \beta 12 \text{inf}) + (\Delta 12 \text{ mod} - \Delta 12 \text{inf})\} \times \beta 13^2 \times \beta Z^2 \quad (16)$$

By suppressing an absolute value in { } of the expression (16), it is possible to suppress the variation of axial chromatic aberration performance over the entire focus range from an object at infinity to a short distance object. By defining conditions of the zoom lens configuration, dispersion characteristics of lens materials, and refractive powers thereof using the conditional expressions (1) to (7), it is possible to suppress the absolute value in { } of the expression (16).

The conditional expression (1) defines a relationship between Abbe constants ν of the positive lens and the negative lens. When the upper limit condition of the conditional expression (1) is not satisfied, it becomes difficult to maintain performance balance between axial chromatic aberration and lateral chromatic aberration over the entire zoom range. In addition, when the lower limit condition of the conditional expression (1) is not satisfied, it becomes difficult to suppress the variation of axial chromatic aberration over the entire focus range. It is more preferred that the conditional expression (1) define the following range.

$$9 \times 10^6 < \nu 11a^3 \times (\nu 12ap - \nu 12an) < 30 \times 10^6 \tag{1a}$$

The conditional expression (2) defines a relationship between the refractive powers of the first lens subunit and the second lens subunit. When the refractive power $\phi 11$ of the first lens subunit increases to dissatisfy the upper limit condition of the conditional expression (2), the variation of $\Delta 11 \text{inf}$ to $\Delta 11 \text{ mod}$ in the expression (16) increases so that it becomes difficult to suppress the variation of axial chromatic aberration performance over the entire focus range.

In addition, when the refractive power $\phi 12$ of the second lens subunit decreases to dissatisfy the upper limit condition of the conditional expression (2), a movement amount of the second lens subunit due to focusing increases so that it becomes difficult to achieve reductions in size and weight. In addition, when the refractive power $\phi 11$ of the first lens subunit decreases to dissatisfy the lower limit condition of the conditional expression (2), a lens outer diameter of the first lens unit increases so that it becomes difficult to achieve reductions in size and weight. Further, it becomes difficult to achieve a wider angle of field of the zoom lens, or to secure a lens interval between the first lens unit and the second lens unit. When the refractive power $\phi 12$ of the second lens subunit increases to dissatisfy the lower limit condition of the conditional expression (2), a variation from $\Delta 12 \text{inf}$ to $\Delta 12 \text{ mod}$ and a variation from $\beta 12 \text{inf}$ to $\beta 12 \text{ mod}$ in the expression (16) increase so that it becomes difficult to suppress the variation of axial chromatic aberration performance over the entire focus range. It is more preferred that the conditional expression (2) define the following range.

$$1.8 < |\phi 11/\phi 12| < 7.0 \tag{2a}$$

The conditional expression (3) defines a relationship between the refractive powers of the first lens subunit and the entire first lens unit. When the refractive power $\phi 11$ of the first lens subunit increases to dissatisfy the upper limit condition of the conditional expression (3), the variation of $\Delta 11 \text{inf}$ to $\Delta 11 \text{ mod}$ in the expression (16) increases so that it becomes difficult to suppress the variation of axial chromatic aberration performance over the entire focus range. When the refractive power $\phi 1$ of the first lens unit decreases to dissatisfy the upper limit condition of the conditional expression (3), the lens outer diameter of the first lens unit increases so that it becomes difficult to achieve reductions in size and weight. Further, it becomes difficult to achieve a wider angle of field of the zoom lens. In addition, when the refractive power $\phi 11$ of the first lens subunit decreases to dissatisfy the lower limit condition of the conditional expression (3), the lens outer diameter of the first lens unit increases so that it becomes difficult to achieve reductions in size and weight. Further, it becomes difficult to achieve a wider angle of field of the zoom lens, or to secure the lens interval between the first lens unit and the second lens unit. When the refractive power $\phi 1$ of the first lens unit increases to dissatisfy the lower limit condition of the conditional expression (3), it becomes difficult to maintain good optical performance over the entire zoom range and the entire focus range. It is more preferred that the conditional expression (3) define the following range.

$$0.5 < |\phi 11/\phi 1| < 1.0 \tag{3a}$$

The conditional expression (4) defines a relationship between partial dispersion ratios θ of the positive lens and the negative lens. When the upper limit condition of the conditional expression (4) is not satisfied, it becomes difficult to correct secondary spectrum of axial chromatic aberration at the telephoto end. In addition, when the lower limit condition of the conditional expression (4) is not satisfied, the secondary spectrum correction of the axial chromatic aberration at the telephoto end becomes excessive so that it becomes difficult to maintain performance balance between axial chromatic aberration and lateral chromatic aberration over the entire zoom range. It is more preferred that the conditional expression (4) define the following range.

$$0.030 < \theta 11a \times (\theta 12an - \theta 12ap) < 0.045 \tag{4a}$$

The conditional expression (5) defines a relationship between Abbe constants of the first lens subunit and the third lens subunit. By satisfying the conditional expression (5), it is possible to achieve appropriate performance balance between axial chromatic aberration and lateral chromatic aberration over the entire zoom range and the entire focus range. It is more preferred that the conditional expression (5) define the following range.

$$0.6 < \nu 11a/(\nu 13ap - \nu 13an) < 3.5 \tag{5a}$$

The conditional expression (6) defines a relationship between the refractive powers of the third lens subunit and the first lens unit. When the refractive power $\phi 13$ of the third lens subunit increases to dissatisfy the upper limit condition of the conditional expression (6), it becomes difficult to achieve good optical performance at the telephoto end. When the refractive power of the first lens unit decreases to dissatisfy the upper limit condition of the conditional expression (6), the lens outer diameter of the first lens unit increases so that it becomes difficult to achieve reductions in size and weight. Further, it becomes difficult to achieve a wider angle of field of the zoom lens. In addition, when the refractive power of the third lens subunit decreases to dissatisfy the lower limit condition of the conditional expression (6), the lens outer diameter of the first lens unit increases so that it becomes difficult to achieve reductions in size and weight. Further, it becomes difficult to secure the lens interval between the first lens unit and the second lens unit. When the refractive power $\phi 1$ of the first lens unit increases to dissatisfy the lower limit condition of the conditional expression (6), it becomes difficult to maintain good optical performance over the entire zoom range and the entire focus range. It is more preferred that the conditional expression (6) define the following range.

$$0.7 < \phi 13/\phi 1 < 1.3 \tag{6a}$$

The conditional expression (7) defines a relationship of refractive powers of the first lens unit and the second lens unit, and refractive powers at a wide angle end and at the telephoto end in order to achieve a wider angle of field, a higher zoom ratio, and reductions in size and weight.

When the refractive power $\phi 1$ decreases to dissatisfy the lower limit condition of the conditional expression (7), it becomes difficult to achieve a wider angle of field and reduction in size and weight. In addition, when the refractive power ϕ2 increases to dissatisfy the lower limit condition of the conditional expression (7), it becomes difficult to achieve good optical performance over the entire zoom range. When the refractive power ϕ1 increases to dissatisfy the upper limit condition of the conditional expression (7), it becomes difficult to maintain good optical performance over the entire zoom range and the entire focus range. In addition, when the refractive power ϕ2 decreases to dissatisfy the upper limit condition of the conditional expression (7), it becomes difficult to secure a zoom ratio and to achieve a small size and light weight. It is more preferred that the conditional expression (7) define the following range.

$$0.18 < |\phi 1/\phi 2| < 0.30 \tag{7a}$$

In addition, some of the conditional expressions (1) to (7) use the average value for defining. When a lens having an extremely small refractive power like a flat glass plate is included, the range of the conditional expression may be exceeded. Therefore, it is supposed that using any number of lenses having an extremely small refractive power is included in the present invention.

Embodiment 1

FIG. 1 illustrates a lens cross-sectional view of a zoom lens at the wide angle end and in focus at an object distance of infinity according to Embodiment 1 of the present invention.

The zoom lens of this embodiment includes, in order from the object side to the image side, a front lens unit having a positive refractive power as a first lens unit F, a variator having a negative refractive power as a second lens unit V that moves for zooming, a compensator having a negative refractive power as a third lens unit C, a stop SP, and a fixed relay lens unit having a positive refractive power and an image forming action as a fourth lens unit R.

The first lens unit F includes, in order from the object side to the image side, the first lens subunit that does not move for focusing, the second lens subunit that moves in an optical axis direction during focusing, and the third lens subunit that does not move for focusing. The second lens unit V monotonously moves on the optical axis to the image plane side to zoom from the wide angle end to the telephoto end. The third lens unit C moves non-linearly on the optical axis in order to correct image plane variation due to zooming. The variator V and the compensator C construct a zoom optical system. A glass block P illustrated in FIG. 1 is a color separation prism, an optical filter, or the like. An image plane I corresponds to an image plane of an image pickup element of an image pickup apparatus connected to the zoom lens of the present invention, and receives light from the zoom lens.

Figure 4:
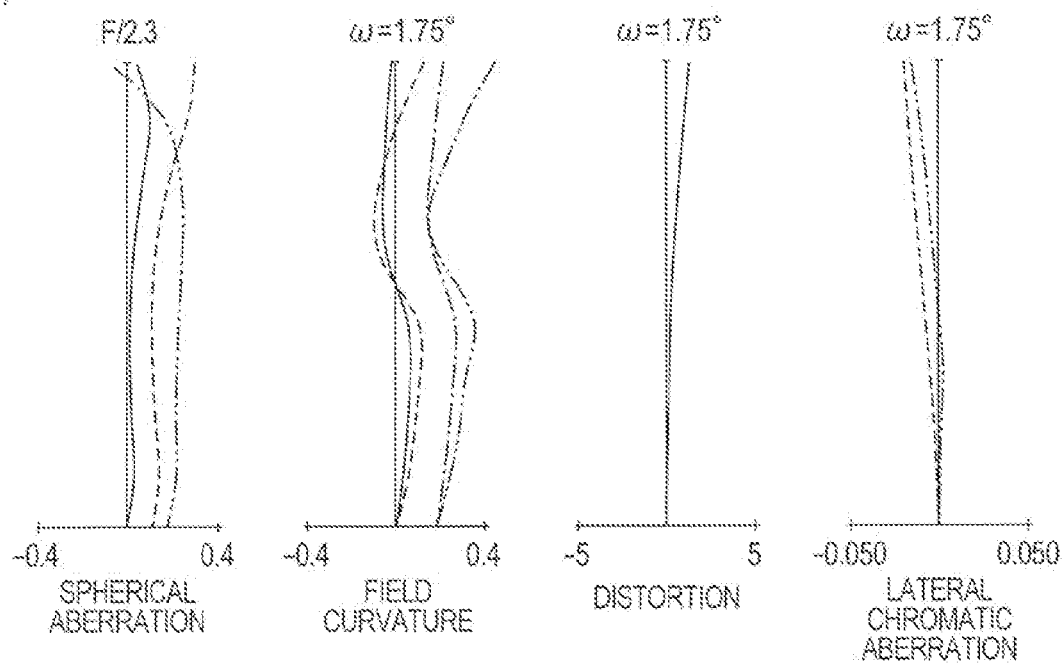
FIG. 4 is an aberration diagram at the telephoto end and in focus at infinity according to Numerical Embodiment 1.

FIG. 2 illustrates an aberration diagram in focus at a distance of 2.5 m from a vertex of a first surface of the lens at the wide angle end of Embodiment 1. FIG. 3 illustrates an aberration diagram in focus at an object distance of 3.5 m at the telephoto end. FIG. 4 illustrates an aberration diagram in focus at an object distance of infinity at the telephoto end.

Figure 5:
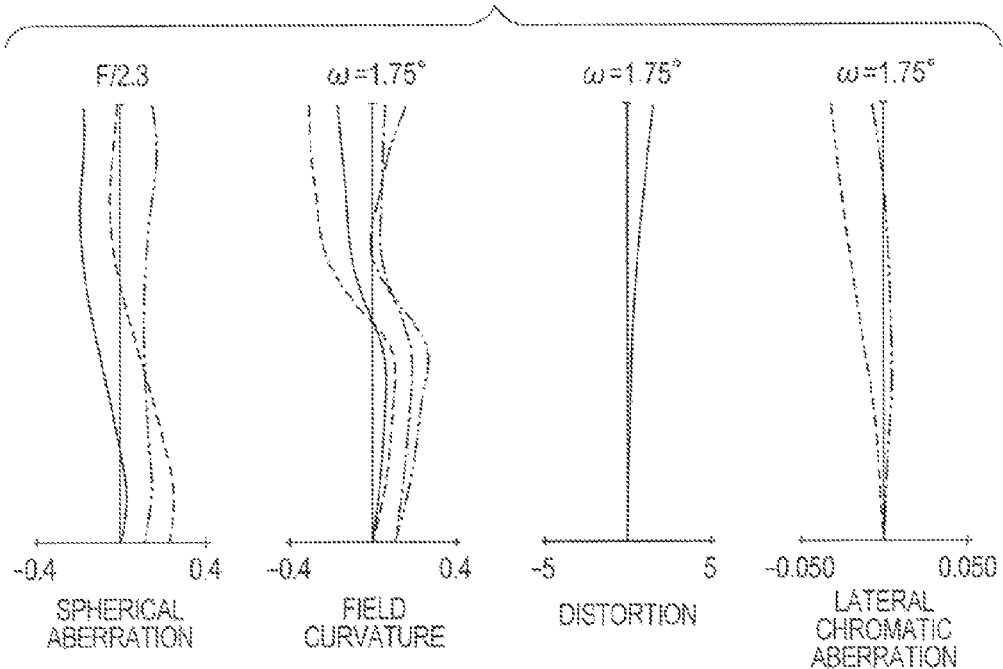
FIG. 5 is an aberration diagram at the telephoto end and in focus at 0.85 m according to Numerical Embodiment 1.

FIG. 5 illustrates an aberration diagram in focus at a minimum object optical distance of 0.85 m at the telephoto end.

The aberration diagram illustrates, in order from the left to the right, spherical aberration, field curvature, distortion, and lateral chromatic aberration. A unit of the horizontal axis in each aberration diagram is mm for the spherical aberration, the field curvature, and the lateral chromatic aberration, and is % for the distortion. For the spherical aberration, the distortion, and the lateral chromatic aberration, a solid line indicates an e-line, a double-dotted dashed line indicates a g-line, and a dotted dashed line indicates a C-line. For the field curvature, a solid line indicates a sagittal section of the e-line, a dotted line indicates a meridional section of the e-line, a dotted dashed line indicates a sagittal section of the g-line, and a double-dotted dashed line indicates a value in the meridional section of the g-line. The same is true in the following embodiments.

In the following, Numerical Embodiment corresponding to this embodiment is described.

An aspherical shape is expressed by the following expression:

$$X = \frac{(1/R)H^2}{1+\sqrt{1-(1+K)(H/R)^2}} + A3 \cdot H^3 + A4 \cdot H^4 + A5 \cdot H^5 + A6 \cdot H^6 + A7 \cdot H^7 + A8 \cdot H^8 + A9 \cdot H^9 + A10 \cdot H^{10} + A11 \cdot H^{11} + A12 \cdot H^{12}$$

where A3 to A12 represent aspheric coefficients, and the aspherical shape is expressed by a displacement x in the optical axis direction with respect to a surface vertex at a position having a height H from the optical axis. Here, R represents a paraxial radius of curvature and K represents a conic constant.

The first lens unit of this embodiment corresponds to the first surface to the sixteenth surface, and includes the first lens subunit from the first surface to the fourth surface, the second lens subunit from the fifth surface to the tenth surface, and the third lens subunit from the eleventh surface to the sixteenth surface.

Table 1 shows variation amounts of imaging positions in focus at a closest distance object and corresponding values of the conditional expressions with respect to the imaging position in focus at an object distance of infinity, for the image position of a light beam close to the optical axis of the g-line at the telephoto end of this embodiment. The variation amount is positive in the direction toward the image plane along the optical axis.

The zoom lens of this embodiment has a feature in that the expressions (1) and (5) are close to the lower limits. Numerical Embodiment 1 satisfies all the conditional expressions. According to the present invention, it is possible to achieve good optical performance with suppressed variation of performance over the entire focus range from an object at infinity to a short distance object with the simple structure of the first lens unit.

Numerical Embodiment 1

| | | | | | | |
|---|---|---|---|---|---|---|
| | | Unit mm | | | | |
| | | Surface data | | | | |
| Surface number | r | d | nd | vd | θgF | Effective diameter |

-continued

| Unit mm | | | | | | |
|---|---|---|---|---|---|---|
| 1 | 326.535 | 3.12 | 1.69680 | 55.5 | 0.543 | 102.07 |
| 2 | 82.442 | 19.62 | | | | 89.85 |
| 3 | −169.843 | 2.90 | 1.64000 | 60.1 | 0.537 | 89.62 |
| 4 | 457.137 | 10.36 | | | | 87.30 |
| 5 | −1260.023 | 8.66 | 1.62041 | 60.3 | 0.543 | 85.61 |
| 6 | −118.623 | 0.15 | | | | 85.45 |
| 7 | 542.881 | 2.60 | 1.89676 | 23.0 | 0.611 | 79.70 |
| 8 | 120.218 | 0.06 | | | | 78.25 |
| 9 | 119.37 | 9.87 | 1.49700 | 81.5 | 0.537 | 78.28 |
| 10 | −458.06 | 11.23 | | | | 78.19 |
| 11 | 162.023 | 9.71 | 1.43387 | 95.1 | 0.537 | 77.50 |
| 12 | −211.577 | 0.15 | | | | 77.67 |
| 13 | 127.700 | 10.54 | 1.59522 | 67.7 | 0.544 | 77.80 |
| 14 | −245.288 | 0.15 | | | | 77.48 |
| 15 | 51.206 | 6.88 | 1.59522 | 67.7 | 0.544 | 68.01 |
| 16 | 82.430 | (Variable) | | | | 66.96 |
| 17 | 223.104 | 1.00 | 1.88300 | 40.8 | 0.567 | 28.44 |
| 18 | 18.464 | 6.08 | | | | 23.50 |
| 19 | −73.560 | 6.21 | 1.92286 | 18.9 | 0.650 | 22.81 |
| 20 | −17.626 | 0.75 | 1.88300 | 40.8 | 0.567 | 22.21 |
| 21 | 284.333 | 0.19 | | | | 21.05 |
| 22 | 27.750 | 4.47 | 1.56732 | 42.8 | 0.573 | 20.35 |
| 23 | −429.295 | 2.31 | | | | 19.04 |
| 24 | −25.489 | 0.75 | 1.88300 | 40.8 | 0.567 | 18.43 |
| 25 | −144.116 | (Variable) | | | | 18.45 |
| 26 | −29.430 | 0.75 | 1.81600 | 46.6 | 0.557 | 20.22 |
| 27 | 61.570 | 3.77 | 1.80810 | 22.8 | 0.631 | 21.85 |
| 28 | −181.636 | (Variable) | | | | 22.98 |
| 29 (Stop) | 0.000 | 1.30 | | | | 27.09 |
| 30 | 827.779 | 5.35 | 1.67003 | 47.2 | 0.563 | 28.18 |
| 31 | −34.493 | 0.14 | | | | 29.04 |
| 32 | 60.461 | 4.63 | 1.51823 | 58.9 | 0.546 | 29.58 |
| 33 | −139.516 | 0.20 | | | | 29.37 |
| 34 | 110.651 | 6.14 | 1.48749 | 70.2 | 0.530 | 28.85 |
| 35 | −34.259 | 1.15 | 1.88300 | 40.8 | 0.567 | 28.27 |
| 36 | 586.479 | (Variable) | | | | 28.21 |
| 37 | 34.309 | 7.35 | 1.51823 | 58.9 | 0.546 | 28.91 |
| 38 | −49.152 | 1.00 | | | | 28.29 |
| 39 | −172.357 | 1.00 | 1.88300 | 40.8 | 0.567 | 26.02 |
| 40 | 26.486 | 4.48 | 1.48749 | 70.2 | 0.530 | 24.43 |
| 41 | 152.332 | 0.50 | | | | 24.08 |
| 42 | 117.611 | 6.70 | 1.48749 | 70.2 | 0.530 | 23.95 |
| 43 | −19.443 | 1.00 | 1.88300 | 40.8 | 0.567 | 23.53 |
| 44 | −38.198 | 1.18 | | | | 24.04 |
| 45 | 51.241 | 3.38 | 1.48749 | 70.2 | 0.530 | 22.82 |
| 46 | −624.228 | 4.50 | | | | 22.15 |
| 47 | 0.000 | 33.00 | 1.60859 | 46.4 | 0.566 | 40.00 |
| 48 | 0.000 | 13.2 | 1.51633 | 64.2 | 0.535 | 40.00 |
| 49 | 0.000 | | | | | 40.00 |

Aspherical surface data

Seventeenth surface

K = −1.42317e+003   A4 = 3.79405e−005   A6 = −3.60242e−009   A8 = −2.54644e−010
A10 = 2.12348e−012   A12 = −4.16310e−015
A3 = 9.41919e−006   A5 = −2.00743e−006   A7 = 4.85928e−009   A9 = −2.60328e−011
A11 = 4.24769e−014

Twenty-second surface

K = 1.15980e+000   A4 = −1.49547e−005   A6 = 6.23650e−008   A8 = −1.26337e−009
A10 = −1.91096e−012   A12 = 7.54862e−014
A3 = −4.26107e−005   A5 = −7.85671e−007   A7 = −2.81272e−009   A9 = 2.92291e−010
A11 = −1.87611e−012

Various data
Zoom ratio 20.51

| | Wide angle | Intermediate | Telephoto |
|---|---|---|---|
| Focal length | 6.80 | 41.21 | 139.50 |
| F-number | 1.97 | 1.95 | 2.69 |
| Angle of field | 38.97 | 7.60 | 2.26 |
| Image height | 5.50 | 5.50 | 5.50 |
| Total lens length | 325.99 | 325.99 | 325.99 |
| BF | 8.65 | 8.65 | 8.65 |
| d16 | 2.03 | 42.89 | 53.18 |

-continued

Unit mm

| | | | |
|---|---|---|---|
| d25 | 56.69 | 9.85 | 9.08 |
| d28 | 4.85 | 10.81 | 1.30 |
| d36 | 35.30 | 35.30 | 35.30 |
| d49 | 8.65 | 8.65 | 8.65 |
| Incident pupil position | 63.08 | 193.55 | 440.88 |
| Exit pupil position | 1107.27 | 1107.27 | 1107.27 |
| Front principal point position | 69.93 | 236.31 | 598.09 |
| Rear principal point position | 1.85 | −32.56 | −130.84 |

Zoom lens unit data

| Unit | First surface | Focal length | Lens structure length | Front principal point position | Rear principal point position |
|---|---|---|---|---|---|
| 1 | 1 | 55.34 | 95.98 | 62.95 | 17.36 |
| 2 | 17 | −13.32 | 21.76 | 4.22 | −9.02 |
| 3 | 26 | −43.25 | 4.52 | −0.48 | −3.00 |
| 4 | 29 | 37.95 | 18.92 | 1.73 | −10.09 |
| 5 | 37 | 53.71 | 77.30 | 9.13 | −45.19 |

Embodiment 2

Figure 6:
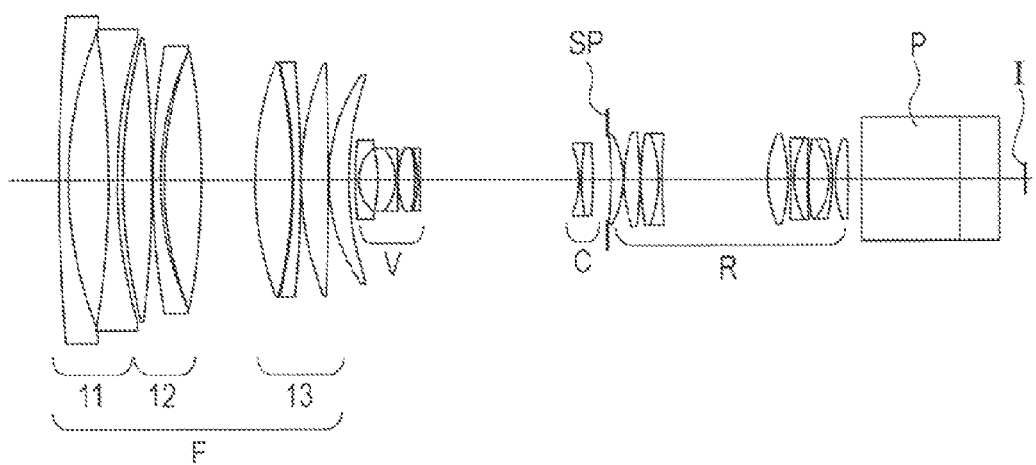
FIG. 6 is a cross-sectional view at the wide angle end and in focus at infinity according to Numerical Embodiment 2.

FIG. 6 illustrates a lens cross-sectional view of the zoom lens at the wide angle end in focus at an object distance of infinity according to Embodiment 2 of the present invention.

The zoom lens of this embodiment includes, in order from the object side to the image side, a front lens unit having a positive refractive power as a first lens unit F, a variator having a negative refractive power as a second lens unit V that moves during zooming, a compensator having a negative refractive power as a third lens unit C, a stop SP, and a fixed relay lens unit having a positive refractive power and an image forming action as a fourth lens unit R.

The first lens unit F includes, in order from the object side to the image side, the first lens subunit that does not move for focusing, the second lens subunit that moves in an optical axis direction during focusing, and the third lens subunit that does not move for focusing. The second lens unit V monotonously moves on the optical axis to the image plane side to zoom from the wide angle end to the telephoto end. The third lens unit C moves non-linearly on the optical axis in order to correct image plane variation due to zooming. The variator V and the compensator C construct a zoom optical system. A glass block P illustrated in FIG. 1 is a color separation prism, an optical filter, or the like. An image plane I corresponds to an image plane of an image pickup element of an image pickup apparatus connected to the zoom lens of the present invention, and receives light from the zoom lens.

Figure 7:
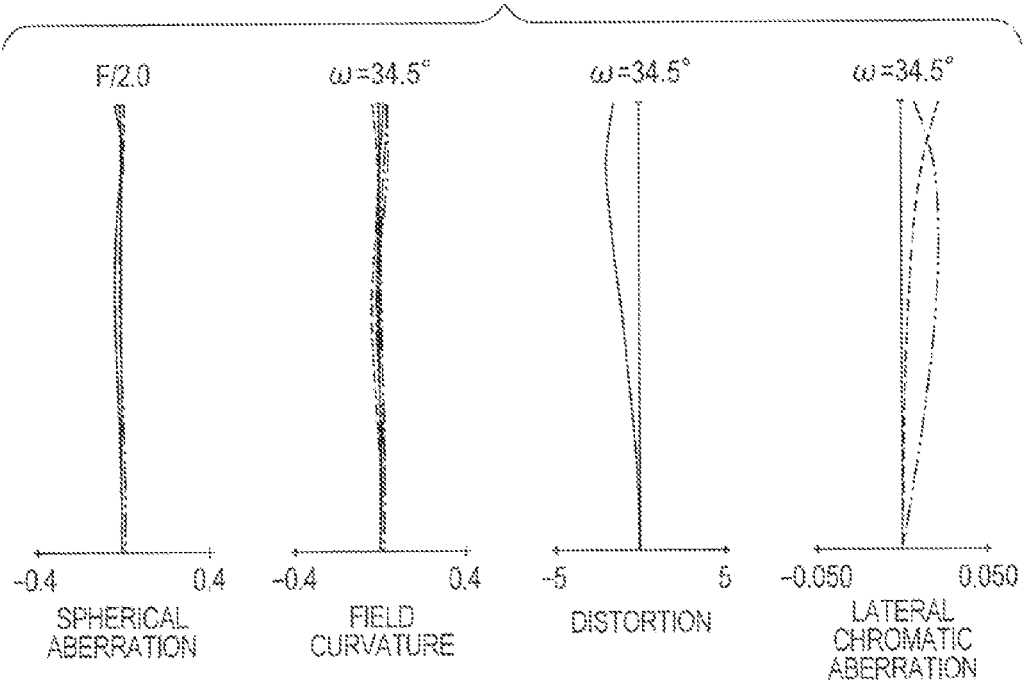
FIG. 7 is an aberration diagram at the wide angle end and in focus at 2.5 m according to Numerical Embodiment 2.
Figure 8:
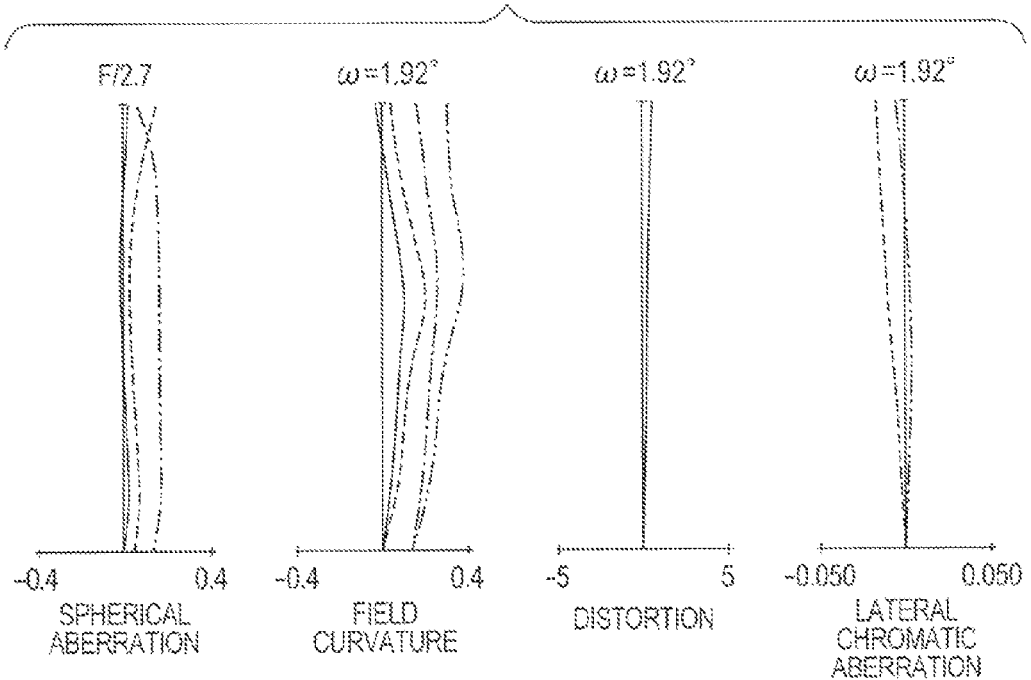
FIG. 8 is an aberration diagram at the telephoto end and in focus at 3.5 m according to Numerical Embodiment 2.
Figure 9:
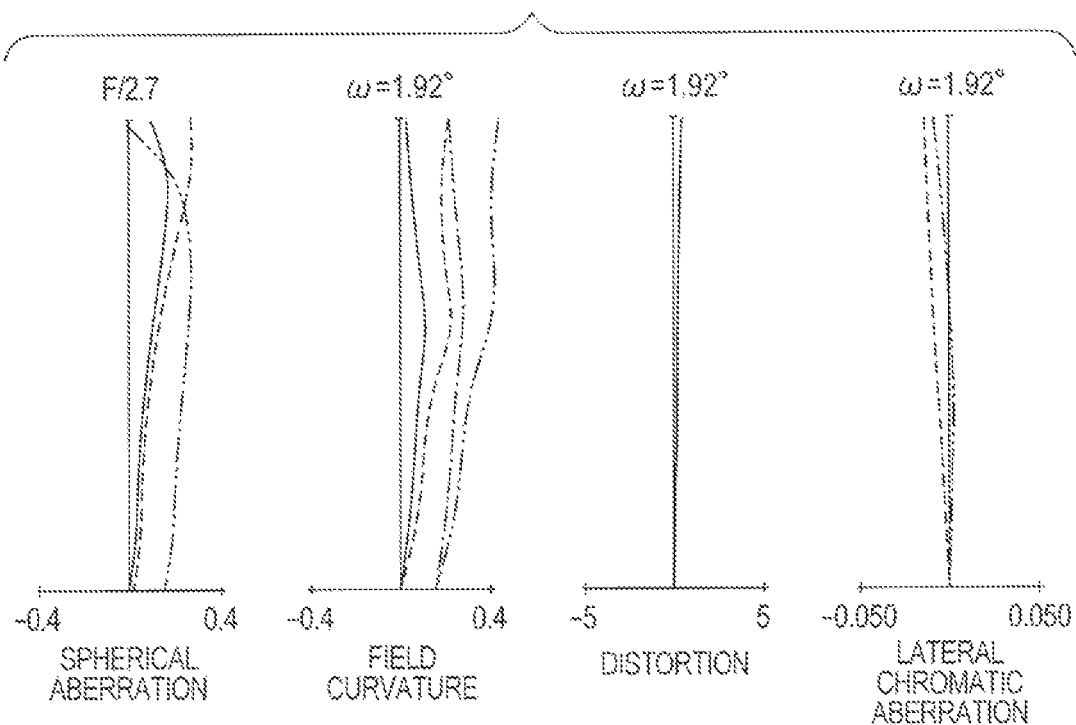
FIG. 9 is an aberration diagram at the telephoto end and in focus at infinity according to Numerical Embodiment 2.
Figure 10:
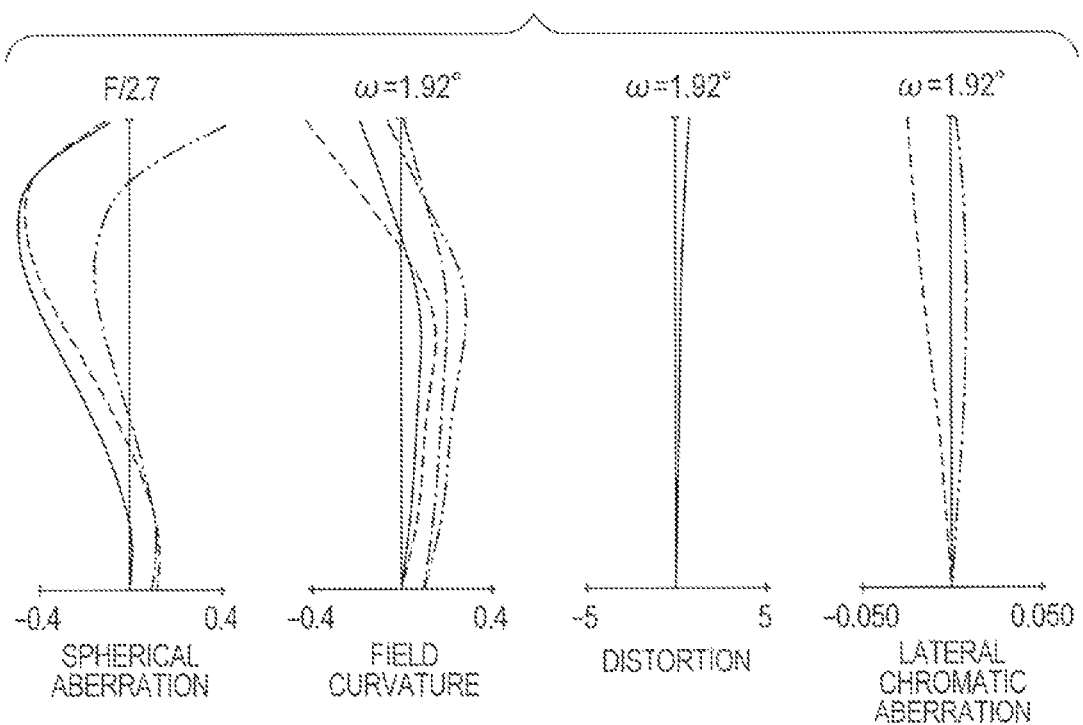
FIG. 10 is an aberration diagram at the telephoto end and in focus at 0.85 m according to Numerical Embodiment 2.

FIG. 7 illustrates an aberration diagram in focus at a distance of 2.5 m from a vertex of a first surface of the lens at the wide angle end of Embodiment 2. FIG. 8 illustrates an aberration diagram in focus at an object distance of 3.5 m at the telephoto end. FIG. 9 illustrates an aberration diagram in focus at an object distance of infinity at the telephoto end. FIG. 10 illustrates an aberration diagram in focus at a minimum object optical distance of 0.85 m at the telephoto end.

The first lens unit of this embodiment corresponds to the first surface to the eighteenth surface, and includes the first lens subunit from the first surface to the fourth surface, the second lens subunit from the fifth surface to the tenth surface, and the third lens subunit from the eleventh surface to the eighteenth surface.

Table 1 shows variation amounts of image positions in focus at a close distance and corresponding values of the conditional expressions with respect to the image position in focus at an object distance of infinity, for the image position of a light beam close to the optical axis of the g-line at the telephoto end of this embodiment. The variation amount is positive in the direction toward the image plane along the optical axis.

The zoom lens of this embodiment has a feature in that the expressions (1), (5), and (6) are close to the upper limits, and the expressions (2), (3), (4), and (7) are close to the lower limits.

Numerical Embodiment 2 satisfies all the conditional expressions. According to the present invention, it is possible to achieve good optical performance with suppressed variation of performance over the entire focus range from an object at infinity to a short distance object with the simple structure of the first lens unit.

Numerical Embodiment 2

Unit mm

Surface data

| Surface number | r | d | nd | vd | θgF | Effective diameter |
|---|---|---|---|---|---|---|
| 1 | 635.963 | 3.12 | 1.64000 | 60.1 | 0.537 | 106.03 |
| 2 | 132.576 | 13.35 | | | | 97.52 |
| 3 | −304.897 | 2.90 | 1.49700 | 81.5 | 0.537 | 97.40 |
| 4 | 168.803 | 1.92 | | | | 91.87 |
| 5 | 184.712 | 9.75 | 1.43387 | 95.1 | 0.537 | 91.42 |

-continued

| | | | Unit mm | | | |
|---|---|---|---|---|---|---|
| 6 | −384.210 | 0.15 | | | | 90.90 |
| 7 | 252.194 | 2.60 | 1.84666 | 23.8 | 0.603 | 86.24 |
| 8 | 103.580 | 1.26 | | | | 82.26 |
| 9 | 118.656 | 12.50 | 1.43387 | 95.1 | 0.537 | 82.24 |
| 10 | −231.352 | 17.86 | | | | 82.11 |
| 11 | 113.023 | 12.49 | 1.59522 | 67.7 | 0.544 | 76.80 |
| 12 | −163.251 | 0.45 | | | | 76.70 |
| 13 | −161.806 | 2.37 | 1.77250 | 49.6 | 0.552 | 76.60 |
| 14 | −399.495 | 0.15 | | | | 76.80 |
| 15 | 103.772 | 9.10 | 1.49700 | 81.5 | 0.537 | 75.88 |
| 16 | −1123.478 | 0.15 | | | | 75.37 |
| 17 | 61.402 | 6.68 | 1.59522 | 67.7 | 0.544 | 68.07 |
| 18 | 104.593 | (Variable) | | | | 66.45 |
| 19 | 211.537 | 1.00 | 1.88300 | 40.8 | 0.567 | 25.00 |
| 20 | 13.555 | 6.40 | | | | 19.91 |
| 21 | −48.675 | 5.92 | 1.92286 | 18.9 | 0.650 | 19.59 |
| 22 | −16.822 | 0.75 | 1.88300 | 40.8 | 0.567 | 19.75 |
| 23 | 248.618 | 0.19 | | | | 19.78 |
| 24 | 26.790 | 5.69 | 1.56732 | 42.8 | 0.573 | 19.94 |
| 25 | −40.427 | 0.83 | | | | 19.43 |
| 26 | −35.916 | 0.75 | 1.88300 | 40.8 | 0.567 | 19.26 |
| 27 | 1266.739 | (Variable) | | | | 19.54 |
| 28 | −27.875 | 0.75 | 1.81600 | 46.6 | 0.557 | 20.24 |
| 29 | 64.230 | 3.80 | 1.80810 | 22.8 | 0.631 | 21.98 |
| 30 | −137.856 | (Variable) | | | | 23.12 |
| 31 | 0.000 | 1.30 | | | | 27.36 |
| 32 | −126.052 | 4.06 | 1.67003 | 47.2 | 0.563 | 27.77 |
| 33 | −31.943 | 0.14 | | | | 28.55 |
| 34 | 43.506 | 5.62 | 1.51823 | 58.9 | 0.546 | 30.11 |
| 35 | −122.349 | 0.20 | | | | 29.92 |
| 36 | 82.040 | 6.03 | 1.48749 | 70.2 | 0.530 | 29.26 |
| 37 | −40.840 | 1.15 | 1.88300 | 40.8 | 0.567 | 28.62 |
| 38 | 177.690 | (Variable) | | | | 28.31 |
| 39 | 37.769 | 6.86 | 1.51823 | 58.9 | 0.546 | 28.60 |
| 40 | −50.856 | 1.00 | | | | 28.04 |
| 41 | −221.775 | 1.00 | 1.88300 | 40.8 | 0.567 | 25.98 |
| 42 | 28.189 | 4.40 | 1.48749 | 70.2 | 0.530 | 24.56 |
| 43 | 183.482 | 0.50 | | | | 24.50 |
| 44 | 78.324 | 6.82 | 1.48749 | 70.2 | 0.530 | 24.55 |
| 45 | −21.482 | 1.00 | 1.88300 | 40.8 | 0.567 | 24.40 |
| 46 | −56.126 | 1.18 | | | | 25.16 |
| 47 | 41.302 | 4.22 | 1.48749 | 70.2 | 0.530 | 25.26 |
| 48 | −337.860 | 4.50 | | | | 24.88 |
| 49 | 0.000 | 33.00 | 1.60859 | 46.4 | 0.566 | 40.00 |
| 50 | 0.000 | 13.20 | 1.51633 | 64.2 | 0.535 | 40.00 |
| 51 | 0.000 | | | | | 40.00 |

Aspherical surface data

Nineteenth surface

K = −1.42317e+003  A4 = 3.71629e−005  A6 = 1.91864e−009  A8 = −3.96049e−010
A10 = 3.84440e−012  A12 = −5.88236e−015
A3 = 1.71450e−005  A5 = −2.01987e−006  A7 = 2.03343e−009  A9 = −3.39056e−012
A11 = −6.48408e−014

Twenty-fourth surface

K = 1.15980e+000  A4 = −6.20631e−006  A6 = 5.61707e−008  A8 = −1.23147e−009
A10 = 3.00740e−012  A12 = 6.72120e−014
A3 = −4.34636e−005  A5 = −1.05401e−006  A7 = 2.67413e−009  A9 = 1.75172e−010
A11 = −1.68464e−012

Various data
Zoom ratio 20.51

| | Wide angle | Intermediate | Telephoto |
|---|---|---|---|
| Focal length | 8.00 | 48.49 | 164.11 |
| F-number | 1.97 | 1.95 | 2.75 |
| Angle of field | 34.51 | 6.47 | 1.92 |
| Image height | 5.50 | 5.50 | 5.50 |
| Total lens length | 323.23 | 323.23 | 323.23 |
| BF | 8.57 | 8.57 | 8.57 |
| d18 | 2.28 | 43.15 | 53.44 |
| d27 | 53.20 | 6.37 | 5.59 |
| d30 | 4.85 | 10.81 | 1.30 |
| d38 | 35.30 | 35.30 | 35.30 |

-continued

| Unit mm | | | |
|---|---|---|---|
| d51 | 8.57 | 8.57 | 8.57 |
| Incident pupil position | 74.85 | 255.58 | 599.66 |
| Exit pupil position | 1200.00 | 1200.00 | 1200.00 |
| Front principal point position | 82.90 | 306.04 | 786.38 |
| Rear principal point position | 0.57 | −39.92 | −155.55 |

| Zoom lens unit data | | | | | |
|---|---|---|---|---|---|
| Unit | First surface | Focal length | Lens structure length | Front principal point position | Rear principal point position |
| 1 | 1 | 65.11 | 96.79 | 63.17 | 5.27 |
| 2 | 19 | −13.32 | 21.52 | 1.64 | −12.67 |
| 3 | 28 | −43.25 | 4.55 | −0.64 | −3.19 |
| 4 | 31 | 37.95 | 18.49 | 1.26 | −10.20 |
| 5 | 39 | 53.32 | 77.68 | 8.90 | −45.46 |

Embodiment 3

Figure 11:
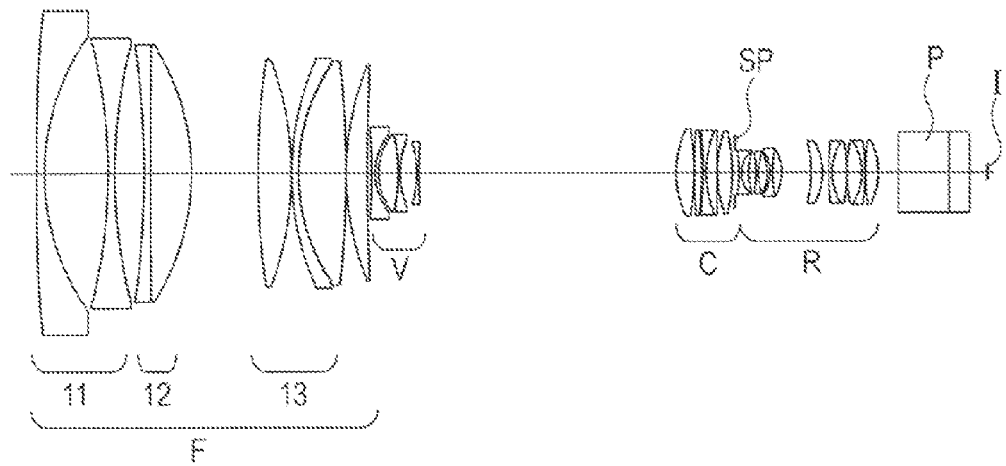
FIG. 11 is a cross-sectional view at the wide angle end and in focus at infinity according to Numerical Embodiment 3.

FIG. 11 illustrates a lens cross-sectional view of a zoom lens at the wide angle end in focus at infinity according to Embodiment 3 of the present invention.

The zoom lens of this embodiment includes, in order from the object side to the image side, a front lens unit having a positive refractive power as a first lens unit F, a variator having a negative refractive power as a second lens unit V that moves during zooming, a compensator having a positive refractive power as a third lens unit C, a stop SP, and a fixed relay lens unit having a positive refractive power and an image forming action as a fourth lens unit R.

The first lens unit F includes, in order from the object side to the image side, the first lens subunit that does not move for focusing, the second lens subunit that moves in an optical axis direction during focusing, and the third lens subunit that does not move for focusing. The second lens unit V monotonously moves on the optical axis to the image plane side to zoom from the wide angle end to the telephoto end. The third lens unit C moves non-linearly on the optical axis in order to correct image plane variation due to zooming. The variator V and the compensator C construct a zoom optical system. A glass block P illustrated in FIG. 1 is a color separation prism, an optical filter, or the like. An image plane I corresponds to an image plane of an image pickup element of an image pickup apparatus connected to the zoom lens of the present invention, and receives light from the zoom lens.

Figure 12:
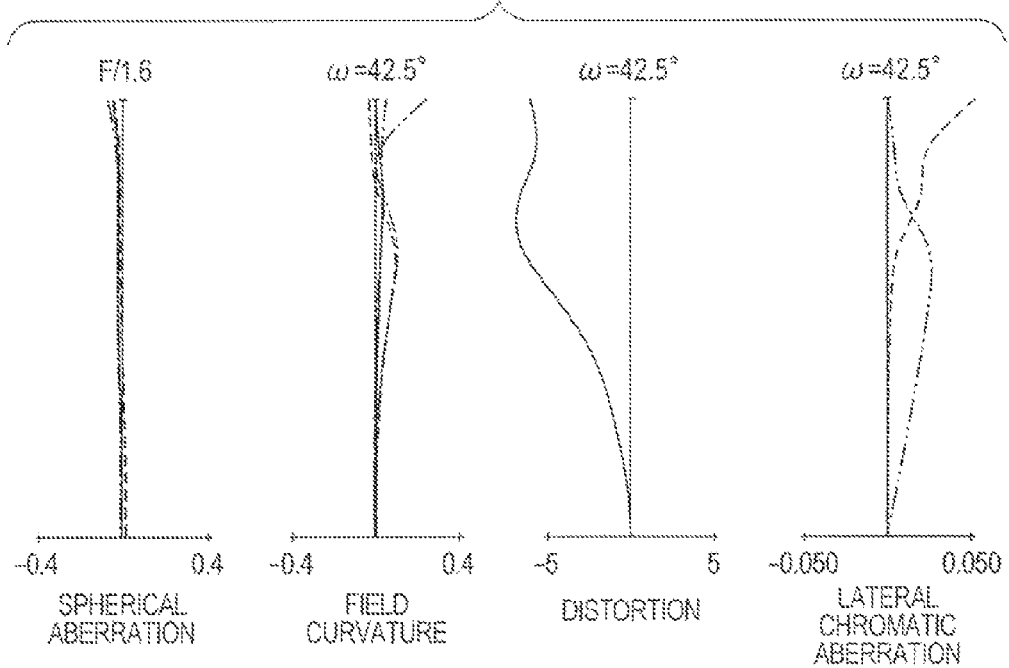
FIG. 12 is an aberration diagram at the wide angle end and in focus at 3.5 m according to Numerical Embodiment 3.
Figure 13:
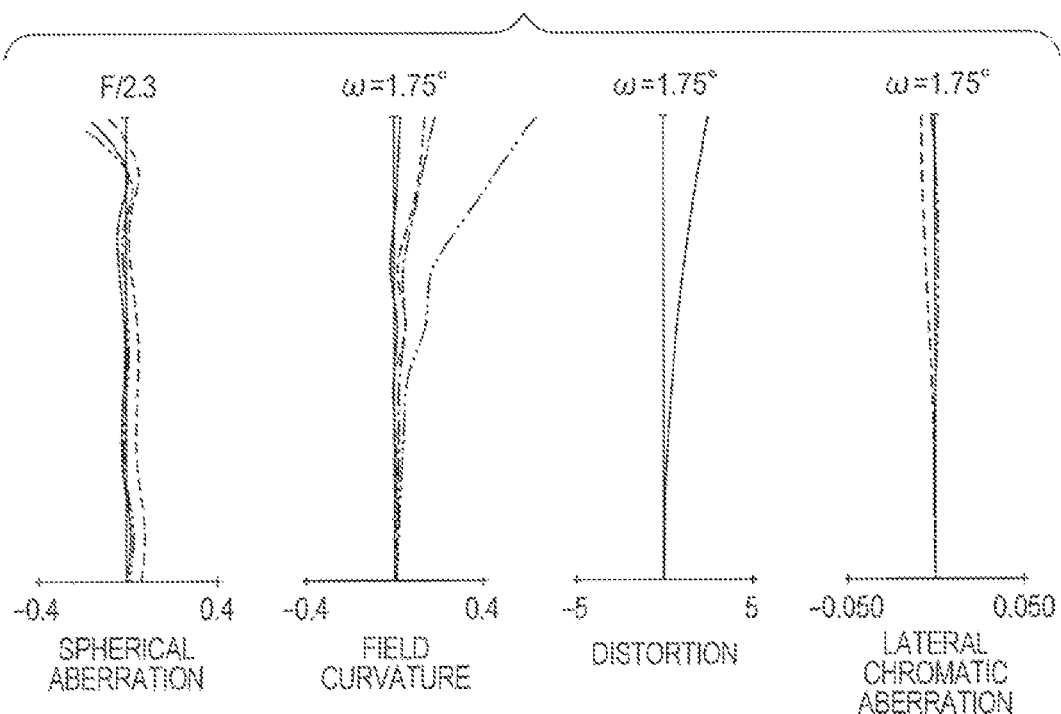
FIG. 13 is an aberration diagram at the telephoto end and in focus at 3.5 m according to Numerical Embodiment 3.
Figure 14:
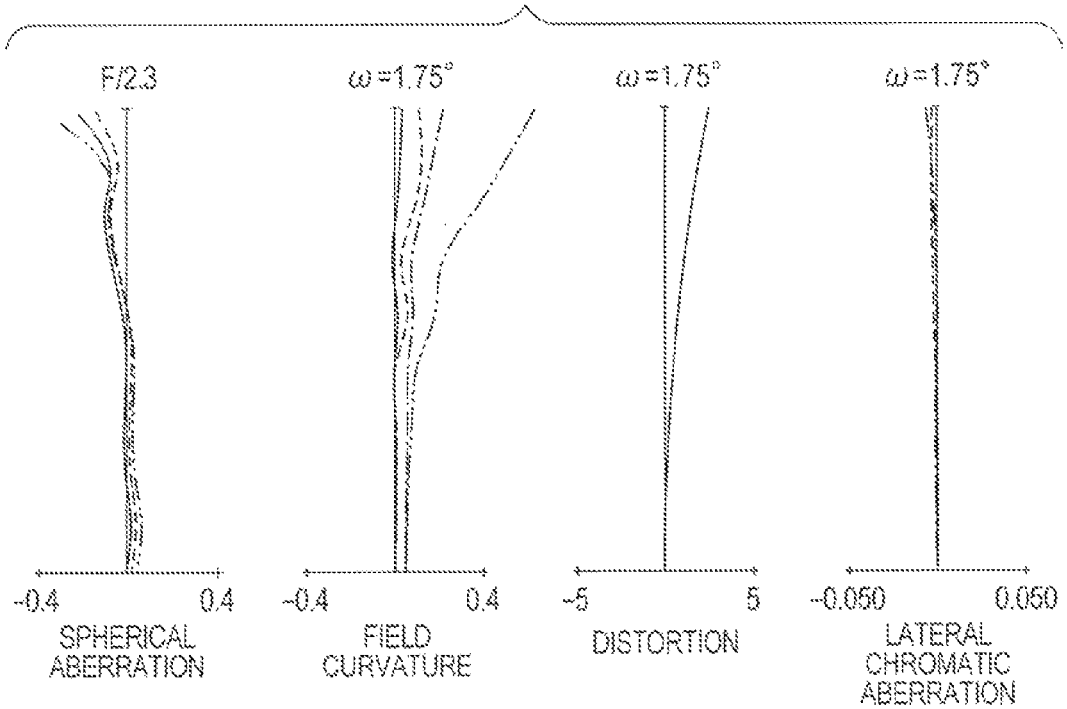
FIG. 14 is an aberration diagram at the telephoto end and in focus at infinity according to Numerical Embodiment 3.
Figure 15:
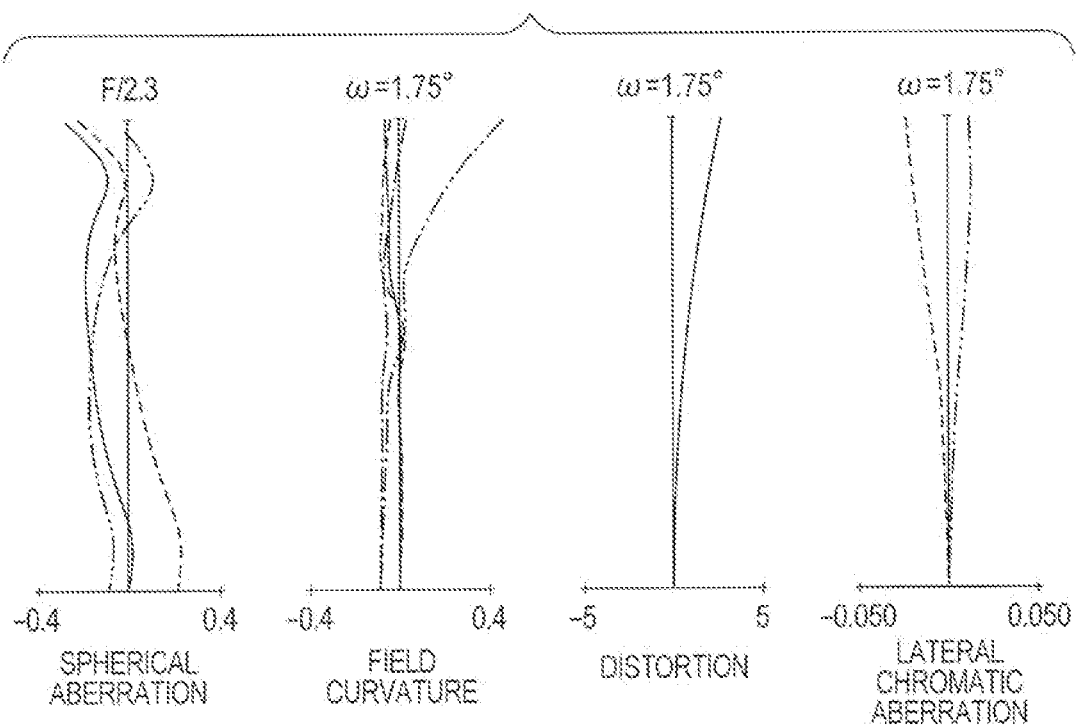
FIG. 15 is an aberration diagram at the telephoto end and in focus at 0.6 m according to Numerical Embodiment 3.

FIG. 12 illustrates an aberration diagram in focus at a distance of 3.5 m from a vertex of a first surface of the lens at the wide angle end of Embodiment 3. FIG. 13 illustrates an aberration diagram in focus at an object distance of 3.5 m at the telephoto end. FIG. 14 illustrates an aberration diagram in focus at an object distance of infinity at the telephoto end. FIG. 15 illustrates an aberration diagram in focus at a minimum object optical distance of 0.6 m at the telephoto end.

The first lens unit of this embodiment corresponds to the first surface to the fifteenth surface, and includes the first lens subunit from the first surface to the fourth surface, the second lens subunit from the fifth surface to the seventh surface, and the third lens subunit from the eighth surface to the fifteenth surface.

Table 1 shows variation amounts of image positions in focus at a close distance and corresponding values of the conditional expressions with respect to the image position in focus at an object distance of infinity, for the image position of a light beam close to the optical axis of the g-line at the telephoto end of this embodiment. The variation amount is positive in the direction toward the image plane along the optical axis.

This embodiment has a feature in that the expressions (2), (3), (4), (5), and (7) are close to the upper limits.

Numerical Embodiment 3 satisfies all the conditional expressions. According to the present invention, it is possible to achieve good optical performance with suppressed variation of performance over the entire focus range from an object at infinity to a short distance object with the simple structure of the first lens unit.

Numerical Embodiment 3

| Unit mm | | | | | | |
|---|---|---|---|---|---|---|
| Surface data | | | | | | |
| Surface number | r | d | nd | vd | θgF | Effective diameter |
| 1 | 1827.374 | 5.28 | 1.62041 | 60.3 | 0.543 | 202.67 |
| 2 | 151.905 | 40.99 | | | | 172.12 |
| 3 | −336.820 | 4.34 | 1.59522 | 67.7 | 0.544 | 168.87 |
| 4 | 333.950 | 18.86 | | | | 161.03 |
| 5 | −576.133 | 4.14 | 1.89676 | 23.0 | 0.611 | 160.33 |
| 6 | 8486.577 | 26.34 | 1.43875 | 94.9 | 0.534 | 160.59 |
| 7 | −152.838 | 42.91 | | | | 160.72 |
| 8 | 498.689 | 21.62 | 1.43387 | 95.1 | 0.537 | 140.91 |
| 9 | −206.241 | 0.20 | | | | 141.89 |
| 10 | 176.739 | 4.24 | 1.80000 | 29.8 | 0.602 | 142.92 |

-continued

| | | | Unit mm | | | |
|---|---|---|---|---|---|---|
| 11 | 126.249 | 0.15 | | | | 139.24 |
| 12 | 124.137 | 30.61 | 1.43387 | 95.1 | 0.537 | 139.51 |
| 13 | −676.188 | 0.15 | | | | 138.69 |
| 14 | 181.430 | 13.56 | 1.59522 | 67.7 | 0.544 | 133.68 |
| 15 | 1495.754 | (Variable) | | | | 132.59 |
| 16 | −339.870 | 2.37 | 1.77250 | 49.5 | 0.552 | 57.57 |
| 17 | 38.827 | 2.25 | | | | 48.15 |
| 18 | 39.734 | 12.50 | 1.80810 | 22.8 | 0.631 | 47.61 |
| 19 | −119.206 | 1.42 | 1.75500 | 52.3 | 0.548 | 48.01 |
| 20 | 56.883 | 10.46 | | | | 41.63 |
| 21 | −68.034 | 1.42 | 1.88300 | 40.8 | 0.567 | 37.59 |
| 22 | 206.909 | (Variable) | | | | 38.50 |
| 23 | 63.779 | 11.89 | 1.60311 | 60.6 | 0.541 | 54.14 |
| 24 | −127.664 | 0.15 | | | | 54.09 |
| 25 | 477.469 | 4.78 | 1.45600 | 90.3 | 0.534 | 53.39 |
| 26 | −177.651 | 0.62 | | | | 53.03 |
| 27 | −312.583 | 1.88 | 1.80518 | 25.4 | 0.616 | 52.41 |
| 28 | 66.849 | 7.00 | 1.49700 | 81.5 | 0.537 | 51.23 |
| 29 | 1292.504 | 0.25 | | | | 51.22 |
| 30 | 70.254 | 9.51 | 1.60311 | 60.6 | 0.541 | 51.28 |
| 31 | −122.032 | (Variable) | | | | 50.77 |
| 32 | 0.000 | 2.67 | | | | 27.52 |
| 33 | −86.165 | 1.50 | 1.75500 | 52.3 | 0.548 | 26.47 |
| 34 | 17.966 | 4.68 | 1.80810 | 22.8 | 0.631 | 24.93 |
| 35 | 42.830 | 5.00 | | | | 24.57 |
| 36 | −54.029 | 1.50 | 1.77250 | 49.6 | 0.552 | 24.61 |
| 37 | 44.067 | 5.40 | 1.60342 | 38.0 | 0.584 | 25.65 |
| 38 | −28.982 | 1.98 | | | | 25.79 |
| 39 | −23.954 | 1.60 | 1.81600 | 46.6 | 0.557 | 25.67 |
| 40 | 77.096 | 5.88 | 1.59551 | 39.2 | 0.580 | 28.99 |
| 41 | −29.020 | 18.76 | | | | 29.33 |
| 42 | −83.163 | 7.53 | 1.53172 | 48.8 | 0.563 | 36.46 |
| 43 | −39.171 | 4.18 | | | | 38.20 |
| 44 | 195.219 | 2.00 | 1.88300 | 40.8 | 0.567 | 38.28 |
| 45 | 35.281 | 9.48 | 1.49700 | 81.5 | 0.537 | 37.70 |
| 46 | −98.039 | 0.19 | | | | 38.18 |
| 47 | 97.193 | 9.59 | 1.48749 | 70.2 | 0.530 | 38.74 |
| 48 | −37.015 | 2.00 | 1.72151 | 29.2 | 0.605 | 38.65 |
| 49 | −137.205 | 0.20 | | | | 39.45 |
| 50 | 136.692 | 8.41 | 1.48749 | 70.2 | 0.530 | 39.50 |
| 51 | −45.320 | 13.04 | | | | 39.29 |
| 52 | 0.000 | 33.00 | 1.60859 | 46.4 | 0.566 | 50.00 |
| 53 | 0.000 | 13.20 | 1.51633 | 64.2 | 0.535 | 50.00 |
| 54 | 0.000 | | | | | 50.00 |

Aspherical surface data

First surface

K = −8.69519e+001   A4 = −3.47108e−010   A6 = −4.74203e−012   A8 = −4.20690e−014
A10 = 7.94625e−018   A12 = 3.19482e−022
A3 = 1.20625e−007   A5 = 9.32151e−011   A7 = 1.52457e−012   A9 = 1.01796e−016
A11 = −9.42635e−020

Sixteenth surface

K = −2.07514e+002   A4 = 4.08573e−007   A6 = 2.74421e−010   A8 = 1.19778e−013
A10 = 5.67687e−018   A12 = −8.47261e−018
A3 = −1.27957e−006   A5 = −4.00784e−008   A7 = 1.23492e−010   A9 = −3.03665e−013
A11 = 4.66186e−016

Twenty-fourth surface

K = −4.64153e+000   A4 = 1.49522e−006   A6 = 2.46711e−010   A8 = −2.17611e−012
A10 = −9.19332e−016   A12 = −5.08645e−018
A3 = −3.66022e−006   A5 = −3.67979e−008   A7 = 3.69369e−011   A9 = −1.19861e−014
A11 = 2.34421e−016

Thirty surface

K = 6.53399e−001   A4 = −5.20729e−007   A6 = −1.73166e−009   A8 = −3.26956e−012
A10 = 1.15604e−015   A12 = −2.48520e−018
A3 = −4.48490e−006   A5 = −1.65097e−008   A7 = 4.44966e−011   A9 = 9.41486e−014
A11 = 2.57580e−017

-continued

Unit mm

Various data
Zoom ratio 29.98

|  | Wide angle | Intermediate | Telephoto |
|---|---|---|---|
| Focal length | 6.00 | 26.17 | 179.90 |
| F-number | 1.55 | 1.55 | 2.30 |
| Angle of field | 42.51 | 11.87 | 1.75 |
| Image height | 5.50 | 5.50 | 5.50 |
| Total lens length | 614.53 | 614.53 | 614.53 |
| BF | 11.83 | 11.83 | 11.83 |
| d15 | 2.66 | 79.66 | 120.52 |
| d22 | 166.35 | 76.63 | 1.18 |
| d31 | 2.00 | 14.71 | 49.30 |
| d54 | 11.83 | 11.83 | 11.83 |
| Incident pupil position | 113.77 | 213.05 | 820.97 |
| Exit pupil position | 92.11 | 92.11 | 92.11 |
| Front principal point position | 120.22 | 247.76 | 1404.05 |
| Rear principal point position | 5.83 | −14.35 | −168.08 |

Zoom lens unit data

| Unit | First surface | Focal length | Lens structure length | Front principal point position | Rear principal point position |
|---|---|---|---|---|---|
| 1 | 1 | 110.18 | 213.39 | 138.47 | 73.19 |
| 2 | 16 | −28.30 | 30.44 | 13.76 | −6.52 |
| 3 | 23 | 48.00 | 36.07 | 11.35 | −14.52 |
| 4 | 32 | 28.36 | 151.80 | 43.41 | 10.31 |

TABLE 1

Variation amounts of image positions depending on object distance and corresponding values of conditional expressions

| Conditional expression number | Numerical Embodiment 1 | Numerical Embodiment 2 | Numerical Embodiment 3 |
|---|---|---|---|
| (1) | $9.3 \times 10^6$ | $25.3 \times 10^6$ | $18.8 \times 10^6$ |
| (2) | 2.92 | 2.10 | 5.86 |
| (3) | 0.67 | 0.565 | 0.87 |
| (4) | 0.038 | 0.035 | 0.042 |
| (5) | 0.752 | 3.114 | 1.139 |
| (6) | 0.901 | 0.978 | 0.85 |
| (7) | 0.24 | 0.21 | 0.26 |
| Variation amount of image position | −0.073 | −0.058 | −0.135 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-095318, filed Apr. 30, 2013, which is hereby incorporated by reference herein in its entirety.

What is claimed is:

1. A zoom lens, comprising, in order from an object side to an image side:
a first lens unit having a positive refractive power;
a second lens unit having a negative refractive power which moves during zooming;
a third lens unit;
a stop; and
a fourth lens unit having a positive refractive power,
wherein the first lens unit includes, in order from the object side to the image side, a first lens subunit having a negative refractive power which does not move, a second lens subunit having a positive refractive power which moves during focusing, and a third lens subunit having a positive refractive power which does not move,
wherein the first lens subunit is composed of one or more negative lenses, and the second lens subunit includes at least one positive lens and at least one negative lens, and
wherein the following expression is satisfied:

$$9 \times 10^6 < v11a^3 \times (v12ap - v12an) < 45 \times 10^6,$$

where $v11a$ represents an average value of Abbe constants of the first lens subunit, $v12ap$ represents an average value of Abbe constants of the at least one positive lens of the second lens subunit, $v12an$ represents an average value of Abbe constants of the at least one negative lens of the second lens subunit, and Abbe constant $v$ is defined as, $$v = (Nd - 1)/(NF - NC)$$

where NF represents a refractive index for F-line, Nd represents a refractive index for d-line, and NC represents a refractive index for C-line.

2. A zoom lens according to claim 1, wherein the following expressions are satisfied:

$$1.8 < |\phi 11/\phi 12| < 7.0, \text{ and}$$

$$0.5 < |\phi 11/\phi 1| < 1.0,$$

where $\phi 11$ represents a refractive power of the first lens subunit, $\phi 12$ represents a refractive power of the second lens subunit, and $\phi 1$ represents a refractive power of the first lens unit.

3. A zoom lens according to claim 1, wherein the following expression is satisfied:

$$0.020 < \theta 11a \times (\theta 12an - \theta 12ap) < 0.046,$$

where $\theta 11a$ represents an average value of partial dispersion ratios of the first lens subunit, $\theta 12ap$ represents an average value of partial dispersion ratios of the at least one positive lens of the second lens subunit, $\theta 12an$ represents an average value of partial dispersion ratios of the at least one negative lens of the second lens subunit, and partial dispersion ratio $\theta$ is defined as, $$\theta = (Ng - NF)/(NF - NC)$$

where NF represents a refractive index for F-line, Ng represents a refractive index for g-line, and NC represents a refractive index for C-line.

4. A zoom lens according to claim 1, wherein the following expressions are satisfied:

$$0.5 < \nu 11a/(\nu 13ap - \nu 13an) < 4.0, \text{ and}$$

$$0.6 < \phi 13/\phi 1 < 1.5,$$

where $\phi 13$ represents a refractive power of the third lens subunit, and $\nu 13a$ represents an average value of Abbe constants of the third lens subunit.

5. A zoom lens according to claim 1, wherein the following expression is satisfied:

$$0.15 < |\phi 1/\phi 2| < 0.30,$$

where $\phi 2$ represents a refractive power of the second lens unit.

6. An image pickup apparatus, comprising:
a zoom lens, comprising, in order from an object side to an image side:
a first lens unit having a positive refractive power;
a second lens unit having a negative refractive power which moves during zooming;
a third lens unit;
a stop; and
a fourth lens unit having a positive refractive power,
wherein the first lens unit includes, in order from the object side to the image side, a first lens subunit having a negative refractive power which does not move, a second lens subunit having a positive refractive power which moves during focusing, and a third lens subunit having a positive refractive power which does not move,
wherein the first lens subunit is composed of one or more negative lens, and the second lens subunit includes at least one positive lens and at least one negative lens, and
wherein the following expression is satisfied:

$$9 \times 10^6 < \nu 11a^3 \times (\nu 12ap - \nu 12an) < 45 \times 10^6,$$

where $\nu 11a$ represents an average value of Abbe constants of the first lens subunit, $\nu 12ap$ represents an average value of Abbe constants of the at least one positive lens of the second lens subunit, $\nu 12an$ represents an average value of Abbe constants of the at least one negative lens of the second lens subunit, and Abbe constant $\nu$ is defined as, $$\nu = (Nd - 1)/(NF - NC)$$

where NF represents a refractive index for F-line, Nd represents a refractive index for d-line, and NC represents a refractive index for C-line; and
an image pickup element for receiving light from the zoom lens.

\* \* \* \* \*